Patented Mar. 20, 1945

2,372,071

UNITED STATES PATENT OFFICE 2,372,071

LUMINESCENT MATERIAL

Harry M. Fernberger, Cleveland Heights, Ohio, assignor to General Electric Company, a corporation of New York No Drawing. Application January 26, 1942, Serial No. 428,331

2 Claims. (Cl. 252—301.4)

This invention relates to luminescent materials or phosphors that are capable of emitting light of various colors when suitably excited. Many of them also show decided phosphorescence or afterglow. In the main, these phosphors are most advantageously excited by ultraviolet radiation of about 3000 Å. to 3800 Å., and especially 3650 Å., to which ordinary glass is transparent, though some of them may be excited by other means, such as the 2537 Å. resonance radiation of mercury, for example. They are suitable for use in fluorescent lamps or tubes of positive column mercury vapor type, such as exemplified by United States Patent 2,259,040 to Inman for 2537 Å., or high-pressure mercury lamps for 3650 Å. When used in low-pressure lamps, the phosphors may be coated on the inner surface of the discharge envelope, and when used in high-pressure lamps they may be coated on the inner surface of an enclosing jacket as illustrated, for example, in McKeag et al. Patent 2,103,085.

Phosphors consist in general of a major proportion of a so-called base material or matrix and a minor proportion of another material called an activator. The luminescent qualities of the phosphor depend on the relations between matrix and activator materials, as determined by heat-treatment which they undergo together, as well as on the identity of these materials themselves.

I have discovered that the rare earth metal europium can be used with special advantage as an activator for various base materials or matrices, and particularly for compounds of the alkaline earth metals, including calcium, strontium, barium, and also (in accordance with the older classification of these metals) magnesium, all of which it generally causes to fluoresce blue, green, or red under ultraviolet excitation, with a red afterglow. While europium is rare and expensive, the amount of it required for fluorescence of reasonable intensity is so small (about 0.01 to 0.1 per cent) that its high cost is not a very serious drawback. The best of the europium activated phosphors, according to my experience, are the fluorides and the sulphides, and especially strontium sulphide, though a calcium phosphate activated with cerium and a small added amount of eropium, such as 0.01 to 0.02 per cent, may be found very advantageous for some purposes.

In preparing europium-activated phosphors, the general procedure may consist in adding a suitable europium compound to a batch of the matrix material in a fine state of division (or to a mixture of components which will react to form the desired matrix material), and firing or heating the batch to a suitable temperature for a substantial length of time. The matrix material(s) used should be of the degree of purity commonly used for other phosphors based on the matrix material(s) in question, but having activators other than europium. The europium compound employed may be incorporated with the matrix material by dissolving the europium compound in water and thoroughly wetting down the finely divided matrix material with the solution to a stiff paste or a slurry, which may then be dried in a steam oven and powdered again. The batch may be heated with or without exposure to the air, or in a protective or reducing atmosphere, as of hydrogen; and sometimes different conditions may be employed in succession during the heating. The temperature of heating may range from about 800° C. to about 1150° C., more or less, and may be maintained from ¼ hour to ½ hour, or even for an hour or more. Firing with or without atmospheric exposure may be done in an open tray or in an open or closed crucible in a refractory electric muffle furnace, and may ordinarily last ¼ to ½ hour; firing in hydrogen may be done in silica boats in a refractory electric muffle or a refractory electric tube furnace, and may ordinarily last an hour.

The europium may be introduced into a batch in the form of any convenient compound, such as the oxide, $Eu_2O_3$, or the lower chloride, $EuCl_2$, which is soluble in water, the nitrate, or the acetate, $Eu(C_2H_3O_2)_3.4H_2O$, also water soluble; but the amount of europium compound used should be calculated merely on the basis of the europium content. Ordinarily, 0.01 to 0.025 per cent of europium is sufficient. In general, no special purity of the europium compound is required, though it should, of course, be free of impurity which might affect the phosphor unfavorably. To be most effective as an activator, as it appears, the europium should generally be in the divalent state in the phosphor, although in some cases the trivalent state seems to be fully effective. In general, a reducing atmosphere in the final stages of heat treatment of the phosphor is desirable, to reduce or convert trivalent europium to the divalent state.

For the assistance of those desiring to use my invention, I will describe specifically the preparation of a variety of alkaline-earth-metal phosphors activated with europium:

*Example A: Calcium silicate*

To a mixture of calcium oxide (CaO) and pure silica ($SiO_2$) in suitable proportions for producing calcium silicate ($CaSiO_3$)—such as 56 g. of calcium oxide and 60 g. of silica—there is added the equivalent of 0.1 per cent of europium. This may be done by dissolving europium acetate, for example, in an amount of water sufficient for mixing purposes, adding the solution to the dry calcium oxide and silica mixture, and working the whole thoroughly into a thick paste. This mixture is dried, and is then heated at about 800° for ¼ hour with free exposure to the air, followed by heating for an hour at 800° C. in hydrogen. After cooling with exclusion of air, the product may be ground, screened and applied to a fluorescent tube wall with the aid of any suitable binder, such as nitrocellulose, in the usual way. The material shows a slight whitish fluorescence under excitation of 2537 Å. radiation, and a strong greenish fluorescence under excitation of 3650 Å. The fluorescence under 2537 Å. excitation is similar in color to a uranium activated calcium silicate fluorescence, though the intensity is less than that from a zinc sulphide phosphor activated with copper.

Example B: Calcium tungstate

Calcium tungstate ($CaWO_4$) with a europium content of 0.01 to 0.025 per cent is fired with exposure to air at about 1100° C. for an hour. After cooling, grinding, and screening, the resulting phosphor may be applied as in Example A. Under excitation of 2537 Å. radiation, this phosphor shows a fluorescence of blue quality similar to that of ordinary unactivated calcium tungstate, but with perhaps a somewhat stronger blue component. It gives a decided red phosphorescent afterglow. In this case the europium is presumably in the trivalent state.

Example C: Calcium sulphide

Calcium sulphide prepared in the dry way from calcium carbonate and sulphur, with a europium content of 0.01 per cent, is fired in a closed crucible at about 1050° C. for some ¼ hour, and then in an atmosphere of hydrogen at about the same temperature for an hour—though the hydrogen may be omitted without material detriment to the product. Under excitation of 3650 Å. radiation, this phosphor shows a reddish fluorescence and a red afterglow; under 2537 Å. it shows a uniform pinkish fluorescence and a red afterglow.

Example D: Strontium sulphide

Strontium sulphide phosphor similarly prepared with a europium content of about 0.02 per cent shows a brighter red fluorescence and afterglow under 3650 Å., and a pink fluorescence under 2537 Å., with red afterglow. After standing in the air, most of the fluorescence under 2537 Å. is lost, though a red afterglow is retained, as well as the red fluorescence and afterglow under 3650 Å.

A mixture of magnesium and strontium sulphides shows similar fluorescence when similarly activated with europium.

Example E: Magnesium sulphate

Magnesium sulphate having a europium content of about 0.01 per cent and prepared by heating to 1100° C. in an open crucible shows a blue fluorescence under 3650 Å.

Example F: Alkaline earth fluorides

Fluorides of calcium and strontium ($CaFl_2$ and $SrFl_2$) having a europium content of 0.01 to 0.02 per cent and prepared as above described, with final heating in hydrogen at about 1000° C. for an hour, show a violet or purplish blue fluorescence under 3650 Å.

Example G: Basic oxides

Phosphors of the oxides of calcium, strontium, barium, and magnesium with a europium content of 0.01 to 0.02 per cent may be prepared by heating to about 1000 to 1150° C. in a closed crucible, and show a red fluorescence under 3650 Å.—whether made from the oxides directly, or from the carbonates. On standing exposed to the air, these phosphors absorb carbon dioxide and are converted into carbonates, which do not fluoresce; but by reheating to about 1000° C. or more to expel the carbon dioxide, the fluorescence is restored.

What I claim as new and desire to secure by Letters Patent of the United States is:

1. Phosphor consisting essentially of a matrix of alkaline-earth-metal sulphide activated with europium in the divalent state, and characterized by red to pink fluorescence under the excitation of 2537 Å. or 3650 Å. radiation, with red afterglow.

2. Phosphor consisting essentially of a matrix of strontium sulphide activated with substantially not over 0.1 per cent of europium, and characterized by red to pink fluorescence under the excitation of 2537 Å. or 3650 Å. radiation, with red afterglow.

HARRY M. FERNBERGER.